Feb. 24, 1970     T. J. PUEGNER     3,497,140
LAWN DRINKING FOUNTAINS
Filed Nov. 27, 1968
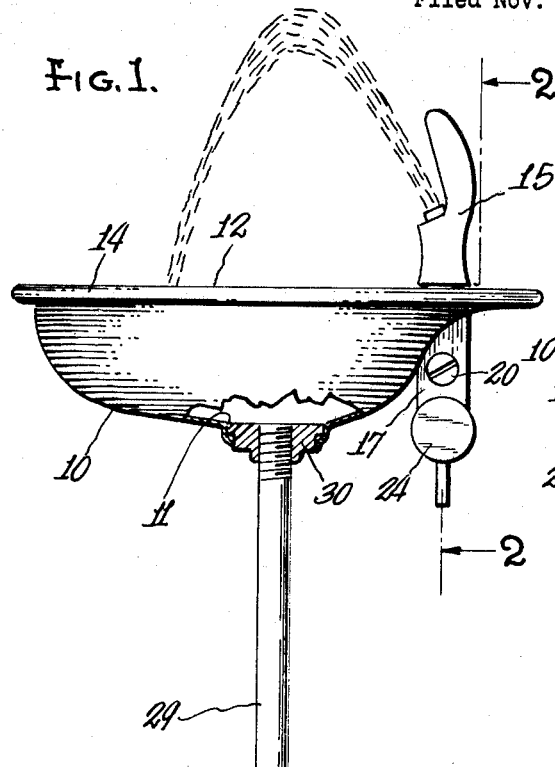
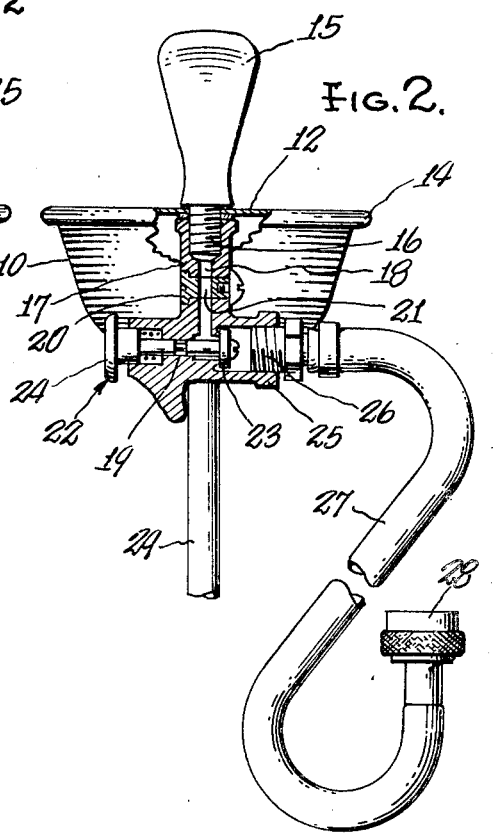
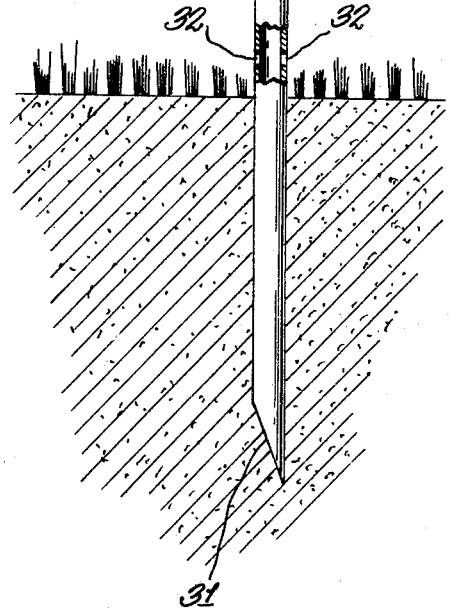
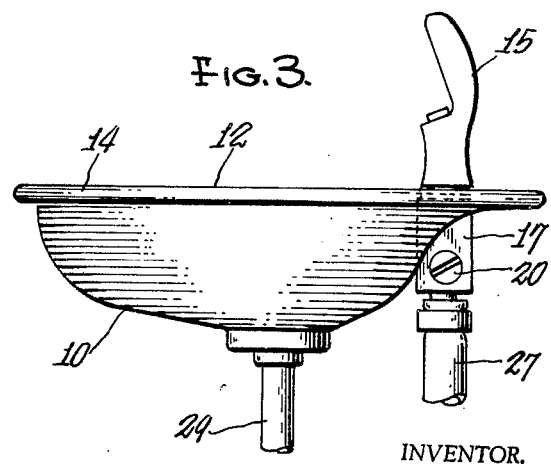
INVENTOR.
THOMAS J. PUEGNER
BY
*Williams and Kreske*
ATTORNEYS

United States Patent Office 3,497,140
Patented Feb. 24, 1970

3,497,140
LAWN DRINKING FOUNTAINS
Thomas J. Puegner, Warren, Ohio, assignor to The Halsey W. Taylor Company, Warren, Ohio
Filed Nov. 27, 1968, Ser. No. 779,361
Int. Cl. E03c 1/32; E03b 9/20
U.S. Cl. 239—29.3        7 Claims

ABSTRACT OF THE DISCLOSURE

A portable water drinking fountain adapted for outside use on the lawn adjoining a dwelling, having a bowl and a water projector carried by the bowl, the projector being connected to an outside sill cock by a flexible hose so that it may be moved from place to place on the lawn, a rigid drain tube being connected to the drain of the bowl and having a pointed lower end for projection into the ground to hold the fountain in upright manner, the drain tube having side openings above the lawn level to spill drain water onto the lawn. The drinking fountain includes a water stream regulator and a water control valve.

BACKGROUND AND SUMMARY

Water drinking fountains of all types have been available for many years, both for indoor and outdoor uses. Fountains for outdoor use included the fixed and portable types, and this invention is primarily directed to the latter type. Increased leisure time has increased outdoor activities and this includes outdoor play and dining on the lawn and property adjacent to dwellings. Since it is inconvenient to transport water from the house to the dining or play area, a demand for an economical outdoor fountain arose. Also, since the outdoor activities shifted from place to place on the lawn or other area, a portable water drinking fountain was preferable.

Applicant is familiar with certain outdoor portable drinking fountains which have a hose connection with the sill cock of the house, but to a large extent these fountains were either of a heavy nature which made their portability difficult, or they were made up of a multiplicity of parts which unnecessarily increased their cost.

The principal object of the present invention is to provide a low cost water drinking fountain which has a hose connection to the house sill cock and which may be easily moved from place to place on the lawn. Unused portions of the drinking water flow through a drain pipe and this pipe not only affords support for the fountain but also has drain holes above the lawn so that the drain water will spill onto the lawn and irrigate it. Thus, the lawn portion which is ordinarily trampled by foot traffic around the fountain is quickly revived.

DESCRIPTION OF DRAWING

In the drawing accompanying this description and forming a part of this specification, there is shown, for purposes of illustration, an embodiment which my invention may assume, and in this drawing:

FIGURE 1 is a broken side elevational view of a portable water drinking fountain embodying my invention, parts being shown in section, FIGURE 2 is a sectional view corresponding to the line 2—2 of FIGURE 1, and FIGURE 3 is a side elevational view similar to FIGURE 1, but showing an economy version of the embodiment.

DESCRIPTION OF PREFERRED EMBODIMENT

The embodiment herein illustrated comprises a bowl 10, preferably of weather-resistant material, such as stainless steel. The bowl has a drain opening 11 in its lower end and a flat rim 12 at its upper end, the rim terminating in a rolled edge 14.

A water projector 15 of any commercially available type is attached to the rim 12. In the presently disclosed construction, the projector has a lower threaded sleeve 16 which passes through an opening in the rim and is threaded into the upper end of a metal body 17 to clamp the rim between the body and a shoulder on the projector. Suitable washers are disposed between the shoulder and rim and between the rim and body.

The body 17 has an upright passage 18 to deliver water to the projector, and a horizontal passage 19 to connect with the lower end of the passage 18. A water stream regulator is preferably interposed in the upright passage and this regulator may be formed as a rotatable plug 20 disposed cross-wise of the body 17 and having an opening 21 which may be aligned fully or partially with the passage 18 to regulate the stream of water flowing to the projector.

The lower end of the body 17 forms a housing for a manually controlled valve 22. The valve has a head 23 which is spring-pressed to seat on a portion of the housing surrounding the horizontal passage 19 to block flow of water through the passage 19 and consequently to the upright passage 18 and the projector 15. It will be noted that the valve head 23 is also held closed by the pressure of water in advance of the head. A pusher head 24 is provided against which a user may push to unseat the valve head 23 and thereby effect flow of water to the projector.

The water inlet 25 of the valve housing has a standard pipe plug 26 threaded therein, the plug being connected to one end of a flexible hose 27, the other hose end having a standard hose fitting 28 which is adapted to be threadably connected to a standard sill cock (not shown) usually found at the exterior of a dwelling. Thus, with the sill cock in open position, water will flow through and from the projector. Unused portions of the projected water will be collected in the bowl 10 and gravitate to the bowl drain 11.

A drain tube 29, also preferably of weather-resistant material, such as stainless steel, has its upper end provided with a head 30 held in watertight relation within a complementary part of the bowl drain, so that water in the bowl will drain downwardly through the tube 29. The lower end of the tube is pointed, as at 31, so that it will easily penetrate the ground to a distance whereby the tube firmly retains the drinking fountain in an upright position. A plurality of openings 32 (here shown two in number) are formed in the lower portion of the drain tube and are adapted to be positioned above the ground level so as to spill drain water onto the ground surrounding the drain tube.

In the construction shown in FIGURE 3, the valve has been omitted, but otherwise the parts are the same and are identified by the same reference numerals. In this construction, the flow of water may be controlled by the sill cock, or the latter may be left open so that water flows continuously from the projector during the time outdoor activities in the area continue.

I claim:
1. A portable water drinking fountain, comprising a bowl, a water projector attached to said bowl and adapted to be connected to a source of water, said projector being adapted to deliver water for drinking purposes, the excess water falling into said bowl, said bowl having a bottom drain outlet, and a rigid drain tube connected to said outlet to receive drain water from said bowl, the lower end end of said tube being adapted to be forced into the ground for supporting said fountain in an upright manner.

2. The construction according to claim 1, wherein the lower end of said drain tube is pointed to facilitate its projection into the ground.

3. The construction according to claim 1, wherein said drain tube has an outlet opening in its side wall which is adapted to be disposed above ground level to spill the drain water onto the ground.

4. The construction according to claim 1, wherein the lower end of said drain tube is pointed to facilitate its projection into the ground, and wherein said drain tube has at least one outlet opening in its side wall which is adapted to be disposed above ground level to spill drain water onto the ground.

5. The construction according to claim 1, and further including a flexible hose adapted to be connected to the outside sill cock of a dwelling.

6. The construction according to claim 5, and further including a water stream regulator in the water supply in advance of the projector.

7. The construction according to claim 5 and further including a manually operable valve for controlling flow of water to said projector.

References Cited

UNITED STATES PATENTS

| | | | |
|---|---|---|---|
| 2,333,727 | 9/1942 | Lucas | 239—276 |
| 2,899,137 | 8/1959 | Martin | 239—29.3 |
| 3,113,723 | 12/1963 | Arnt | 239—29.3 |

EVERETT W. KIRBY, Primary Examiner

T. C. CULP, Jr., Assistant Examiner

U.S. Cl. X.R.

239—272, 276, 279